United States Patent
Lan

(10) Patent No.: US 8,283,033 B2
(45) Date of Patent: Oct. 9, 2012

(54) CERAMIC BALL COMPRISING A CORE PORTION MADE OF KAOLINITE AND FELDSPAR

(76) Inventor: Feiming Lan, Pingxiang (CN)

( * ) Notice: Subject to any disclaimer, the term of this patent is extended or adjusted under 35 U.S.C. 154(b) by 853 days.

(21) Appl. No.: 12/343,439

(22) Filed: Dec. 23, 2008

(65) Prior Publication Data

US 2009/0239075 A1 Sep. 24, 2009

Related U.S. Application Data

(63) Continuation of application No. PCT/CN2008/000702, filed on Apr. 7, 2008.

(30) Foreign Application Priority Data

Mar. 21, 2008 (CN) .......................... 2008 1 0030867

(51) Int. Cl.
*B32B 5/16* (2006.01)
*C04B 33/24* (2006.01)
(52) U.S. Cl. ......... 428/402; 428/403; 428/407; 501/144
(58) Field of Classification Search .................. None
See application file for complete search history.

(56) References Cited

U.S. PATENT DOCUMENTS 4,632,876 A * 12/1986 Laird et al. .................... 428/404
2008/0096018 A1* 4/2008 Zhang et al. .................. 428/402

OTHER PUBLICATIONS

English Abstract of CN 1900013, Zhang, Jan. 2007.*

* cited by examiner

*Primary Examiner* — D. Lawrence Tarazano
*Assistant Examiner* — Ronak Patel
(74) *Attorney, Agent, or Firm* — Matthias Scholl P.C.; Matthias Scholl

(57) ABSTRACT

Provided is a ceramic ball, comprising a core portion and a sphere portion; wherein said core portion is made of clinkers and raw materials; said clinkers are made of kaolinite and feldspar, industrial waste ceramics or a combination thereof; said raw materials are made of kaolinite and feldspar; a weight ratio between the clinkers and the raw materials in said core portion is 1-2:2-3; and a weight ratio between said kaolinite and said feldspar is 5-7.5:1-2.5. A method for producing a ceramic ball is also provided. The invention features low energy consumption, good pressure resistant performance, shock resistance property and long lifetime.

3 Claims, No Drawings

CERAMIC BALL COMPRISING A CORE PORTION MADE OF KAOLINITE AND FELDSPAR

CROSS-REFERENCE TO RELATED APPLICATIONS

This application is a continuation of International Patent Application No. PCT/CN2008/000702 with an international filing date of Apr. 7, 2008, designating the United States, now pending, and further claims priority benefits to Chinese Patent Application No. 200810030867.6, filed on Mar. 21, 2008. The contents of these specifications are incorporated herein by reference.

BACKGROUND OF THE INVENTION

1. Field of the Invention

The invention relates to a ceramic ball and a method for producing the same, and particularly to an inert ceramic ball and a method for producing the same.

2. Description of the Related Art

Conventionally, an inert ceramic ball used in an industrial column is made by one-step forming and high temperature calcination. However, problems with the technique are that it features high energy consumption and poor pressure resistant performance and shock resistance property, is easily crushed, has short lifetime and replacement period and thus directly affects production.

SUMMARY OF THE INVENTION

In view of the above-described problems, it is an objective of the invention to provide a ceramic ball that features low energy consumption, good pressure resistant performance, shock resistance property and long lifetime.

It is another objective of the invention to provide a method for producing a ceramic ball that features low energy consumption, good pressure resistant performance, shock resistance property and long lifetime.

In order to achieve the above objectives, in accordance with one embodiment of the invention, provided is a ceramic ball, comprising a core portion and a sphere portion; wherein said core portion is made of clinkers and raw materials; said clinkers are made of kaolinite and feldspar, industrial waste ceramics or a combination thereof; said raw materials are made of kaolinite and feldspar; a weight ratio between the clinkers and the raw materials in said core portion is 1-2:2-3; and a weight ratio between said kaolinite and said feldspar is 5-7.5:1-2.5.

In a class of this embodiment or in another embodiment, said clinkers are made by mixing, drying and calcining the kaolinite and the feldspar.

In a class of this embodiment or in another embodiment, said clinkers are made by mixing, drying and calcining the kaolinite and the feldspar and then mixing the industrial waste ceramics therewith.

In accordance with another embodiment of the invention, provided is a method for producing a ceramic ball, comprising putting clinkers and raw materials into a granule machine to form a core portion, adding raw materials to the core portion to form a ball billet with a given diameter, drying the ball billet, calcining the ball billet to a temperature between 950° C. and 1320° C., and maintaining the ball billet at a temperature between 950° C. and 1320° C. for 24-30 hours.

In a class of this embodiment or in another embodiment, the raw materials are made of kaolinite and feldspar.

In a class of this embodiment or in another embodiment, the clinkers are made by calcining and crushing the raw materials.

In a class of this embodiment or in another embodiment, the clinkers are made by crushing industrial waste ceramics.

In a class of this embodiment or in another embodiment, the clinkers are made by calcining and crushing the raw materials and then mixing the industrial waste ceramics therewith.

In a class of this embodiment or in another embodiment, a weight ratio between the kaolinite and the feldspar is 5-7.5:1-2.5.

In a class of this embodiment or in another embodiment, a weight ratio between the clinkers and the raw materials in the core portion is 1-2:2-3.

In a class of this embodiment or in another embodiment, it further comprises a step of cooling the ball billet after it is maintained at a temperature between 950° C. and 1320° C. for 24-30 hours.

In a class of this embodiment or in another embodiment, it further comprises a step of tapping the ball billet after the ball billet is cooled.

In a class of this embodiment or in another embodiment, it further comprises a step of testing the ball billet after the ball billet is tapped.

Advantages of the invention comprise: 1) low sintering temperature helps to save energy; 2) use of the industrial waste ceramics improves environment and controls pollution; 3) the invention features good pressure resistant performance and shock resistance property and long lifetime.

BRIEF DESCRIPTION OF THE DRAWINGS

DETAILED DESCRIPTION OF THE EMBODIMENTS

A ceramic ball of the invention comprises a core portion and a sphere portion. The core portion is made of clinkers and raw materials.

A weight ratio between the clinkers and the raw materials in the core portion is 1-2:2-3, and a weight ratio between the kaolinite and the feldspar is 5-7.5:1-2.5.

The raw materials are made of kaolinite and feldspar.

In one embodiment, the clinkers are made by mixing, drying and calcining the kaolinite and the feldspar. In another embodiment, the clinkers are made by mixing, drying and calcining the kaolinite and the feldspar and then mixing the industrial waste ceramics therewith.

A method of producing a ceramic ball comprises steps of: putting clinkers and raw materials into a granule machine to form a core portion, adding raw materials to the core portion to form a ball billet with a given diameter, drying the ball billet, calcining the ball billet to a temperature between 950° C. and 1320° C., maintaining the ball billet at a temperature between 950° C. and 1320° C. for 24-30 hours, cooling the ball billet after it is maintained at a temperature between 950° C. and 1320° C. for 24-30 hours, tapping the ball billet after it is cooled, and testing the ball billet.

In an embodiment, the raw materials are made of kaolinite and feldspar prepared in a ratio of 6:1, and the clinkers are made by drying calcining and crushing the raw materials.

In another embodiment, the raw materials are made of kaolinite and feldspar prepared in a ratio of 3:1, the clinkers are made by crushing industrial waste ceramics, and a weight ratio between the clinkers and the raw materials in the core portion is 1:2.

In a further embodiment, the raw materials are made of kaolinite and feldspar prepared in a ratio of 5:2.5, the clinkers are made by calcining and crushing the raw materials and then mixing the industrial waste ceramics therewith, and a weight ratio between the clinkers and the raw materials in the core portion is 2:3.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

The invention claimed is:

1. A ceramic ball, comprising:
   a core portion; and
   a sphere portion;
   wherein
   said core portion is made of clinkers and raw materials;
   said clinkers are made of kaolinite and feldspar, industrial waste ceramics or a combination thereof;
   said raw materials are made of kaolinite and feldspar;
   a weight ratio between the clinkers and the raw materials in said core portion is 1-2:2-3; and
   a weight ratio between said kaolinite and said feldspar is 5-7.5:1-2.5, wherein the ceramic ball exhibits lower energy consumption, better pressure resistance, higher shock resistance than ceramic ball made without said raw materials.

2. The ceramic ball of claim 1, wherein said clinkers are made by mixing, drying and calcining the kaolinite and the feldspar.

3. The ceramic ball of claim 1, wherein said clinkers are made by mixing, drying and calcining the kaolinite and the feldspar and then mixing the industrial waste ceramics therewith.

* * * * *